United States Patent
Patel

(10) Patent No.: US 8,024,478 B2
(45) Date of Patent: Sep. 20, 2011

(54) IDENTIFYING NETWORK PATH INCLUDING NETWORK PROXIES

(75) Inventor: Alpesh Patel, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 11/729,053

(22) Filed: Mar. 28, 2007

(65) Prior Publication Data
US 2008/0244086 A1    Oct. 2, 2008

(51) Int. Cl.
G06F 15/173    (2006.01)
H04L 12/26    (2006.01)

(52) U.S. Cl. ........ 709/238; 709/239; 709/242; 709/245; 370/248; 370/352

(58) Field of Classification Search .................. 709/238
See application file for complete search history.

(56) References Cited

U.S. PATENT DOCUMENTS

| | | | | |
|---|---|---|---|---|
| 5,781,534 A * | 7/1998 | Perlman et al. | ............... | 370/248 |
| 6,912,587 B1 * | 6/2005 | O'Neil | ............. | 709/232 |
| 2003/0093438 A1 * | 5/2003 | Miller | ......... | 707/104.1 |
| 2003/0153328 A1 * | 8/2003 | Booth et al. | ................. | 455/456 |
| 2003/0219034 A1 * | 11/2003 | Lotter et al. | ................. | 370/469 |
| 2004/0243703 A1 * | 12/2004 | Demmer et al. | ............. | 709/224 |
| 2005/0021738 A1 * | 1/2005 | Goeller et al. | ................ | 709/224 |
| 2005/0114472 A1 * | 5/2005 | Tan | ............... | 709/220 |
| 2006/0098586 A1 * | 5/2006 | Farrell et al. | ................. | 370/254 |
| 2006/0168318 A1 * | 7/2006 | Twiss | ............. | 709/238 |
| 2007/0177524 A1 * | 8/2007 | Qian et al. | .................... | 370/252 |

OTHER PUBLICATIONS

S. Shalunov et al., A One-way Active Measurement Protocol (OWAMP), IETF RFC, Sep. 2006.
/tcptraceroute/, 2 pgs.

* cited by examiner

Primary Examiner — Ashok B Patel
Assistant Examiner — Linglan Edwards
(74) Attorney, Agent, or Firm — Cindy Kaplan

(57) ABSTRACT

A method and system for identifying a network path between a source node and a destination node are disclosed. In one embodiment, the method includes generating a proxy trace message at the source node, transmitting the proxy trace message over the network path towards the destination node, and receiving the proxy trace message at the source node. The proxy trace message follows a path taken by application messages transmitted by the source node and the received proxy trace message includes addresses of the destination node and proxies in the network path.

14 Claims, 6 Drawing Sheets

IDENTIFYING NETWORK PATH INCLUDING NETWORK PROXIES

BACKGROUND OF THE INVENTION

The present disclosure relates generally to identifying a network path including network proxies.

Connection tracing is used in a network to identify problem areas and provide detailed information about the network. A connection trace may be used to determine why connections to a given server might be poor, and can often identify the location of problems in cases of instability or other malfunction. TraceRoute is an example of a tool that is used to trace the route of a packet over each hop from a client to a remote host by reporting all router addresses therebetween.

Conventional route tracing utilities such as TraceRoute often do not detect all nodes in a network path. For example, Application-Oriented Networking (AON) uses Web Cache Communication Protocol (WCCP) for traffic redirection to AON nodes (client proxy and server proxy). The proxy terminates a TCP (Transmission Control Protocol) connection received from a client and initiates a new TCP connection to a server. Since the proxy intercepts the message in the path to the server, the proxy can also route an application message to another proxy before the message is sent to the server. This redirection results in traffic passing through a different path than direct client to server communication. Conventional route tracing messages (e.g., TraceRoute, ICMP echo, ping) are not intercepted and redirected to the proxy and therefore follow a different path than what is actually followed by application messages. Proxies located within a communication path are therefore not identified. This also results in application messages reporting much longer latency than observed by conventional route tracing messages, due to additional processing and interception by a proxy. Also, if RSVP (ReSerVation Protocol) or other protocol is used to reserve end-to-end bandwidth from client to server, bandwidth guarantees calculated based on a direct client to server path are not valid if the actual communication path follows a different path due to redirection to a proxy.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and system for identifying a network path between a source node and a destination node are disclosed. In one embodiment, the method includes generating a proxy trace message at the source node, transmitting the proxy trace message over the network path towards the destination node, and receiving the proxy trace message at the source node. The proxy trace message follows a path taken by application messages transmitted by the source node and the received proxy trace message includes addresses of the destination node and proxies in the network path.

In one embodiment, a method for providing proxy information generally comprises receiving a proxy trace message at a proxy located in a network path between a source node and a destination node, inserting a proxy identifier into the proxy trace message and incrementing a counter in the proxy trace message, and forwarding the proxy trace message to a destination node or another proxy in the network path.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
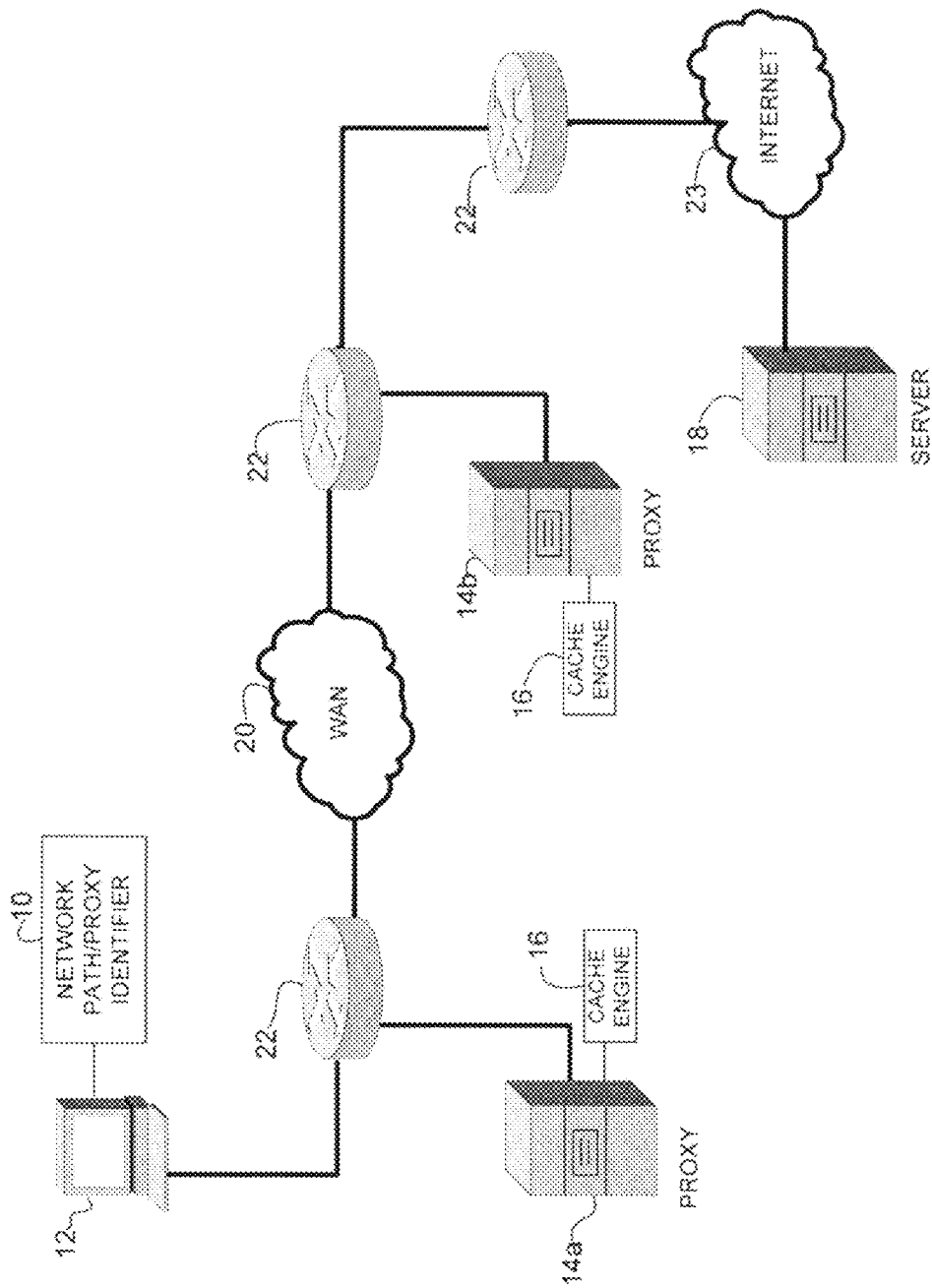
FIG. 1 illustrates an example of a network in which embodiments described herein may be implemented.

Referring now to the drawings, and first to FIG. 1, an example of a network that may implement embodiments described herein is shown. The embodiments operate in the context of a data communication network including multiple network elements. Some of the nodes in a network that employs the embodiments may be network devices such as routers, switches, servers, or user devices. The network device may include, for example, a master central processing unit (CPU), interfaces, and a bus. The CPU preferably includes memory and a processor. The network device may be implemented on a general purpose network host machine such as a computer system or network device described below with respect to FIG. 6.

In the example shown in FIG. 1, a client 12 is in communication with one or more servers 18 through a WAN (wide area network) 20 and a plurality of routers or switches 22. The server 18 is in communication via the Internet 23. A network path/proxy identifier 10 may be used, for example, to identify a connection path between a source node (e.g., client 12) and a destination node (e.g., server 18). The source and destination nodes may be any type of host having a data communication capability.

The network shown in FIG. 1 includes two proxies 14a, 14b. The proxies may be Application-Oriented Networking (AON) nodes, which operate as a client proxy or server proxy. The network may use WCCP (Web Cache Communication Protocol), for example. WCCP operates on a router or switch and interacts with proxy clients to enable routing platforms to transparently redirect content requests. Through the use of service group configuration, the proxy clients specify to the router or switch which traffic to intercept and forward to the proxy client. A benefit of this transparent redirection is that users need not configure their browsers to use a web proxy. Instead, they use a target URL to request content, and have their requests automatically redirected to a cache engine 16 at a proxy. The end user does not know that a requested file (e.g., web page) came from the cache engine instead of from the originally specified server. Cache engines localize web traffic patterns in the network, thus enabling content requests to be fulfilled locally. Traffic localization reduces transmission costs and download time.

It is to be understood that the network shown in FIG. 1 is only one example, and that other network configurations and network devices may be used without departing from the scope of the invention.

The network path/proxy identifier 10 described herein uses proxy trace messages which follow the same path as application messages and therefore report delay/latency as observed by the applications. The network path/proxy identifier uses the same TCP/UDP port as the applications at the client 12. For example, if web traffic is using port 80, the network path/proxy identifier sets up a TCP connection on port 80 and sends a TCP option (described below) in a segment. This allows WCCP, for example, to intercept the traffic and redirect it to the proxy in the same way as it intercepts and redirects application traffic. Since the proxy trace messages are intercepted and queued by the proxies in the same manner as the application messages, the delay approximation is very accurate.

The network path/proxy identifier 10 may be used as a utility at a network device for various applications, including discovering network topology and the analysis of a data path taken by requests passing through proxies due to interception and redirection. The utility may be part of another application or a standalone application. The network path/proxy identifier 10 may also be used to allow a server 18 to detect a real client IP in the data path between the client 12 and server, in cases which a proxy node is seen by a server as a source, rather than the client.

As described in detail below, the client 12 generates a proxy trace message and transmits a control message to establish connections in the network path between the client (source node) and server (destination node) 18. The proxy trace message is sent towards the server 18 and each proxy 14a, 14b in the network path inserts a node identifier. The proxy trace message is reflected back to the client to provide the client with information about the network path including information about the proxies 14a, 14b located within the path. In the example shown in FIG. 1, the client 12 receives a packet (proxy trace message) containing the IP address of the server 18 and each proxy 14a, 14b in the data communication path. In one embodiment, the received proxy trace message also includes a counter identifying the number of proxies in the network path.

In one embodiment, the control message is a TCP synchronization packet with an option (referred to herein as an "echo option") set to instruct the nodes to insert their IP address in the proxy trace message sent back to the source node (i.e., echoed back to the originating device). In one embodiment, the node identifiers are IP addresses which are stored in a data field (referred to herein as "echo payload") of a TCP packet. The echo payload is not passed to the application, but instead echoed back by the end TCP stack (or relayed by proxies to the real destination). Proxy nodes intercepting traffic include the same echo option in the outbound connection and do not operate as an end node.

Figure 2:
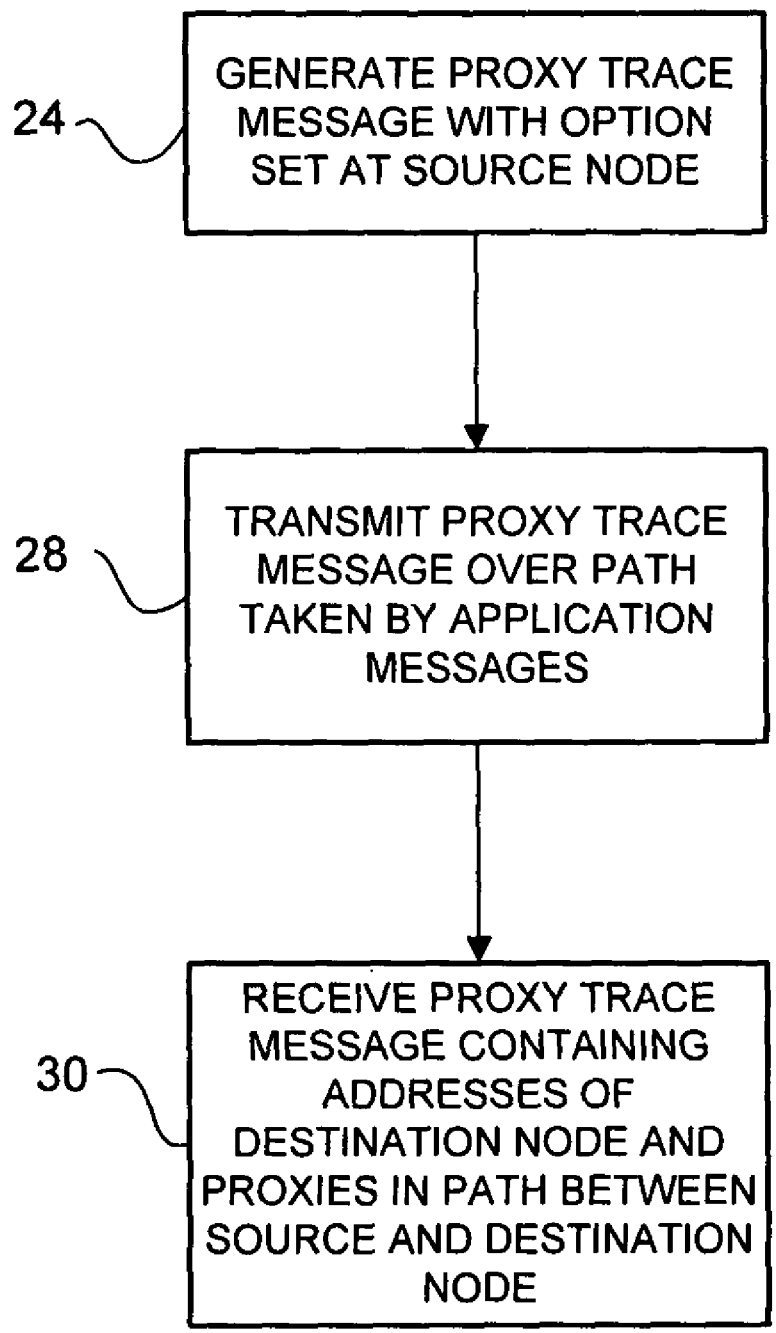
FIG. 2 is a flowchart illustrating a process for identifying at a client a data path through a proxy in accordance with one embodiment.
Figure 4:
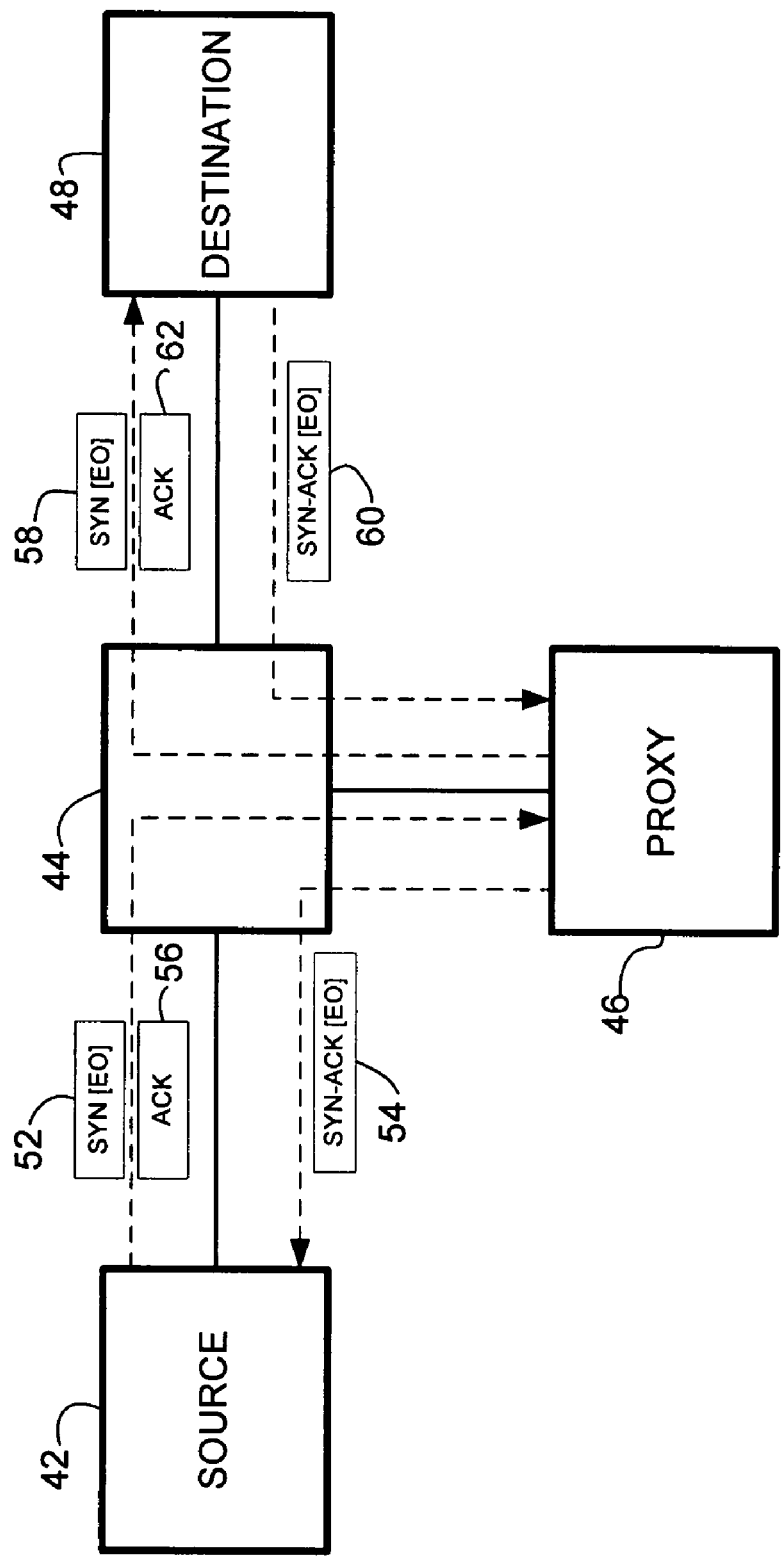
FIG. 4 is a block diagram illustrating an example of packet flow for a control message used to establish connections along the network path, according to one embodiment.

FIG. 2 is a flowchart illustrating an overview of one embodiment for identifying at a source node, a network path including proxies. At step 24 the source node (client) generates a proxy trace message. In one embodiment, the message is a TCP packet with an echo option enabled. A control message (control plane packet) is transmitted to establish a connection in the network path between the source node and destination node (server), as illustrates in the example of FIG. 4. An example of the flow of the control message is illustrated in FIG. 4. The client (source node 42) sends synchronization (SYN flag set) packet 52 to initiate a connection. The SYN packet 52 has an echo option (EO) enabled in the Options field of the TCP packet header. TCP packets transmitted with the echo option enabled will not impact operation at the destination node 48 or any intermediate nodes (e.g., router/switch 44) if they are not configured to recognize or utilize the echo option, since network devices are typically configured to ignore options that the devices do not understand. The header of the TCP packet also includes a Source Port field, which identifies the sending port of the source node, and a Destination Port field, which identifies the receiving port of the destination node. The header may also include other standard fields of a TCP header (e.g., Sequence number, Acknowledgement number, Data offset, Flags) or other fields which may be used to describe connection configurations.

The packet 52 is received at node 44 and redirected to proxy 46. Proxy 46 replies with a synchronization and acknowledgement (SYN-ACK) packet 54. The echo option is also set in this packet. The source node 42 sends an acknowledgement packet 56 to the proxy 48 and a connection between the source node 42 and proxy 46 is established. This process is repeated between proxy 46 and destination node 48 with SYN packet 58 (echo option set), SYN-ACK packet 60 (echo option set), and ACK packet 62. If additional proxies are located in the communication path between the source node 42 and destination node 48, additional TCP connections will be established. For example if a second proxy was located in the data path as shown in FIG. 1, a TCP connection would be established between the two proxies (14a, 14b) and another connection established between proxy 14b and the server 18.

Figure 5:
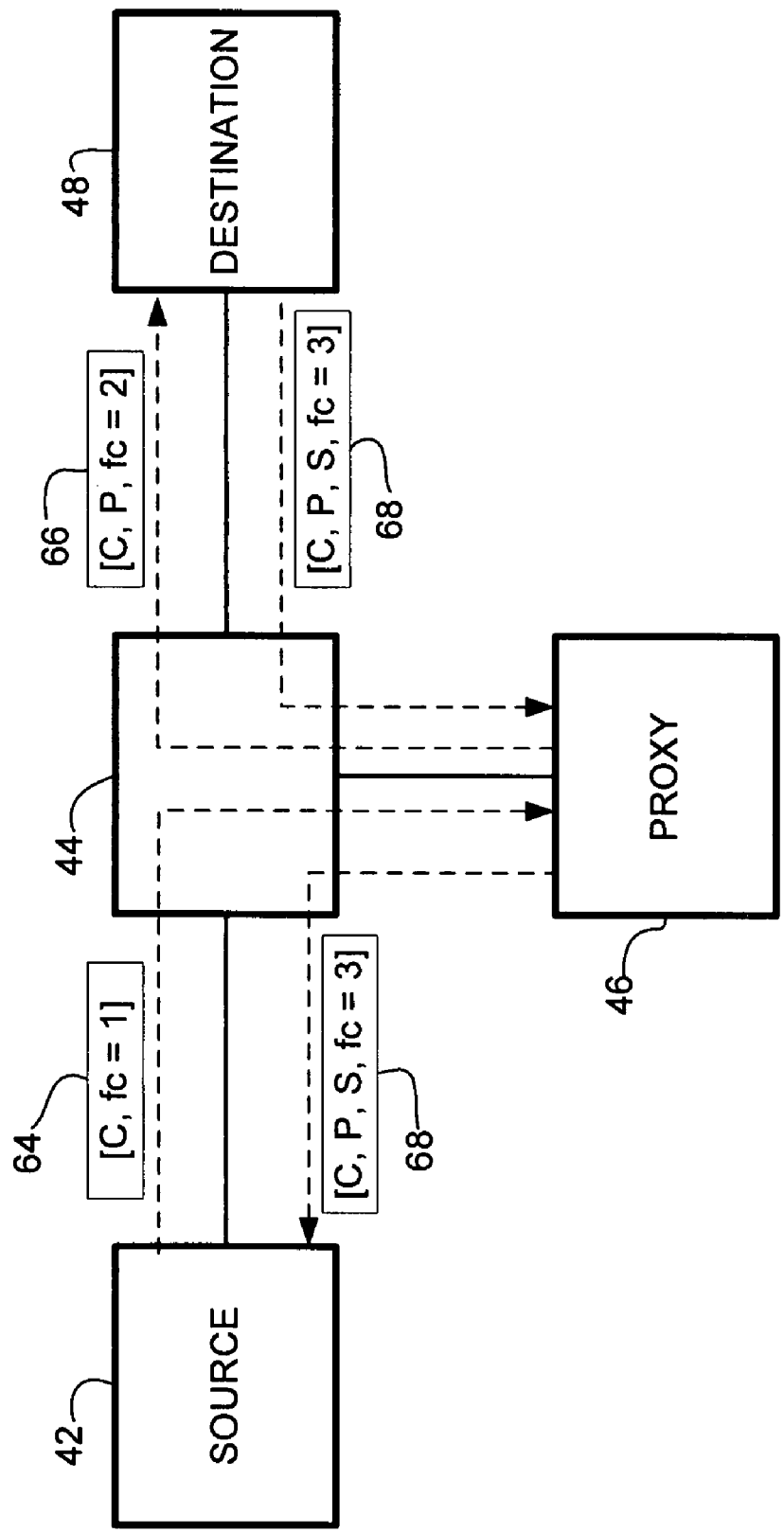
FIG. 5 is a block diagram illustrating an example of packet flow for a proxy trace message containing addresses of a destination node and the proxy within the network path, according to one embodiment.

The proxy trace message is transmitted over the network path identified by the established connections (step 28) (FIG. 2). The proxy trace message follows the path taken by application messages transmitted from the source node 42. The proxy trace message is a data plane packet sent from the source node 42 towards the destination node 48, where the message is reflected back to the source node. As illustrated in FIG. 5, the proxy trace message generated at the source node includes a source node identifier (C) and a counter (fc=1) (packet 64). (FIG. 5 is described further below with respect to the flowchart of FIG. 3 describing the process at the proxy.) Each node processing the proxy trace message at the transport layer inserts its identifier (e.g., IP address or any other suitable identifier) in the payload of the packet and increments the counter by one. At step 30 in the flowchart of FIG. 2, the source node 42 receives the returned proxy trace message (packet 68 in FIG. 5) which identifies real server (destination node 48) and the proxy 46 in the network path. The source node 42 can then identify the connection path through the proxy 46 based on information in the received proxy trace message. The proxy trace message may also be used to identify network delay/latency as observed by an application at the source node 42, as previously discussed.

Figure 3:
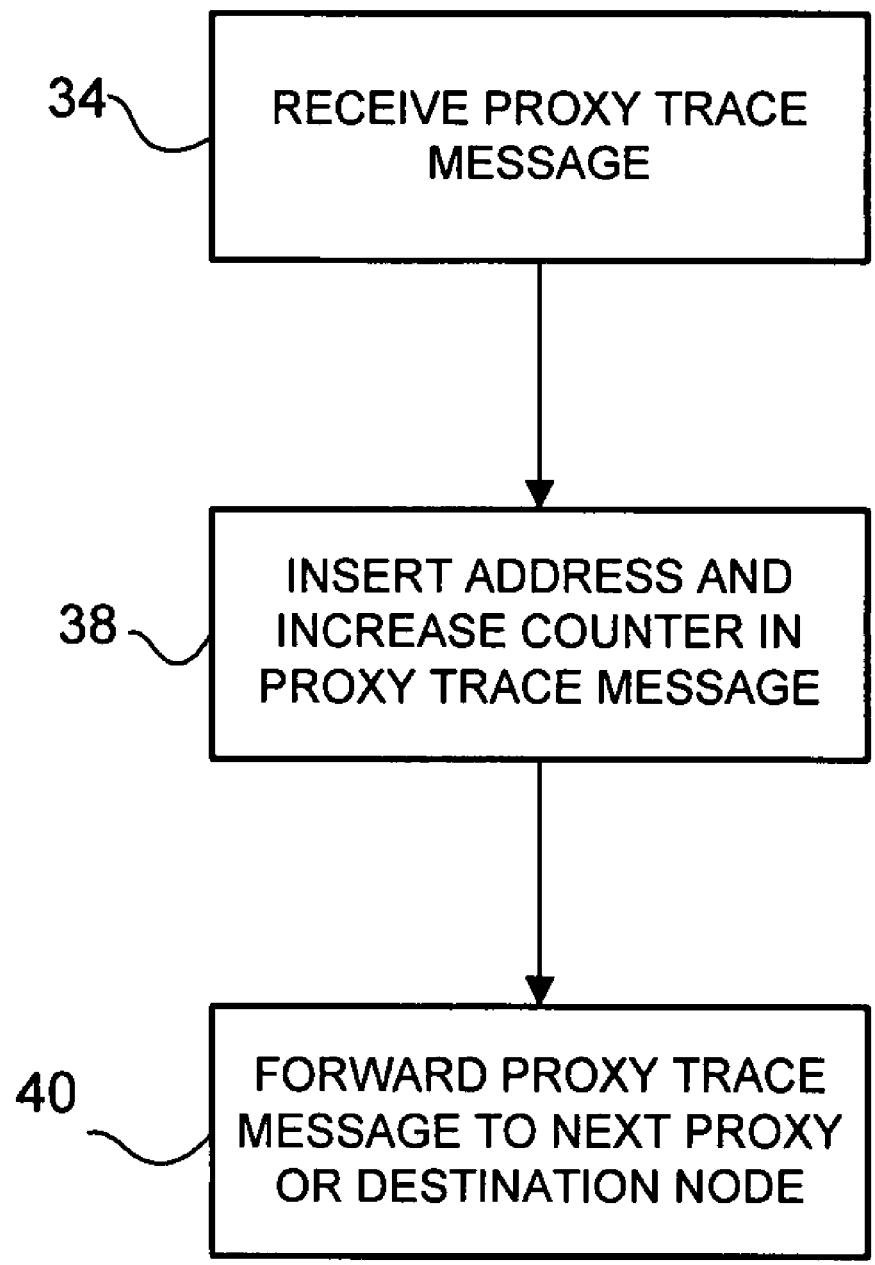
FIG. 3 is a flowchart illustrating a process at a proxy for providing information about the data path containing the proxy to the client.

FIG. 3 is a flowchart illustrating the process described above from the proxy's perspective. As described above and shown in FIG. 4, the proxy 46 establishes a TCP connection with the destination node 48 (or another proxy in the network path). The proxy trace message 64 transmitted from the source node 42 is received at node 44 and redirected to proxy 46 (step 34 of FIG. 3) (FIG. 5). The proxy 46 inserts its identifier (e.g., IP address) in the proxy trace message and increments the counter by one (step 38). The packet 66 containing source node (client) identifier C, proxy identifier P, and counter fc=2, is then transmitted to the destination node 48 (or next proxy in path) (step 40) (FIGS. 3 and 5). When the destination node (server) 48 receives the packet 66, it inserts its identifier S and increments the counter to 3. The proxy 46 receives the packet 68 from the destination node 48 and forwards it to the source node 42.

It is to be understood that the process described above is only one example and that variations to the process may be made without departing from the scope of the invention. For example, the method described above utilizes TCP packets, however, it is to be understood that other packets or protocols may be used. For example, UDP (User Datagram Protocol) may be used instead of TCP, in which case the data can be transmitted without first establishing connections. Also, the proxies may update the proxy trace packets received on a return path from the destination node 48. For example, the proxy may insert another node identifier to the end of the list of identifiers in the proxy trace packet so that the source node knows that the packet passed through the proxy on its return path to the source node. Typically, the request path and response path include the same set of proxies, however, if different proxies are located in the return path, they will be identified if these additional identifiers are inserted as the packet is transmitted back to the source node.

Figure 6:
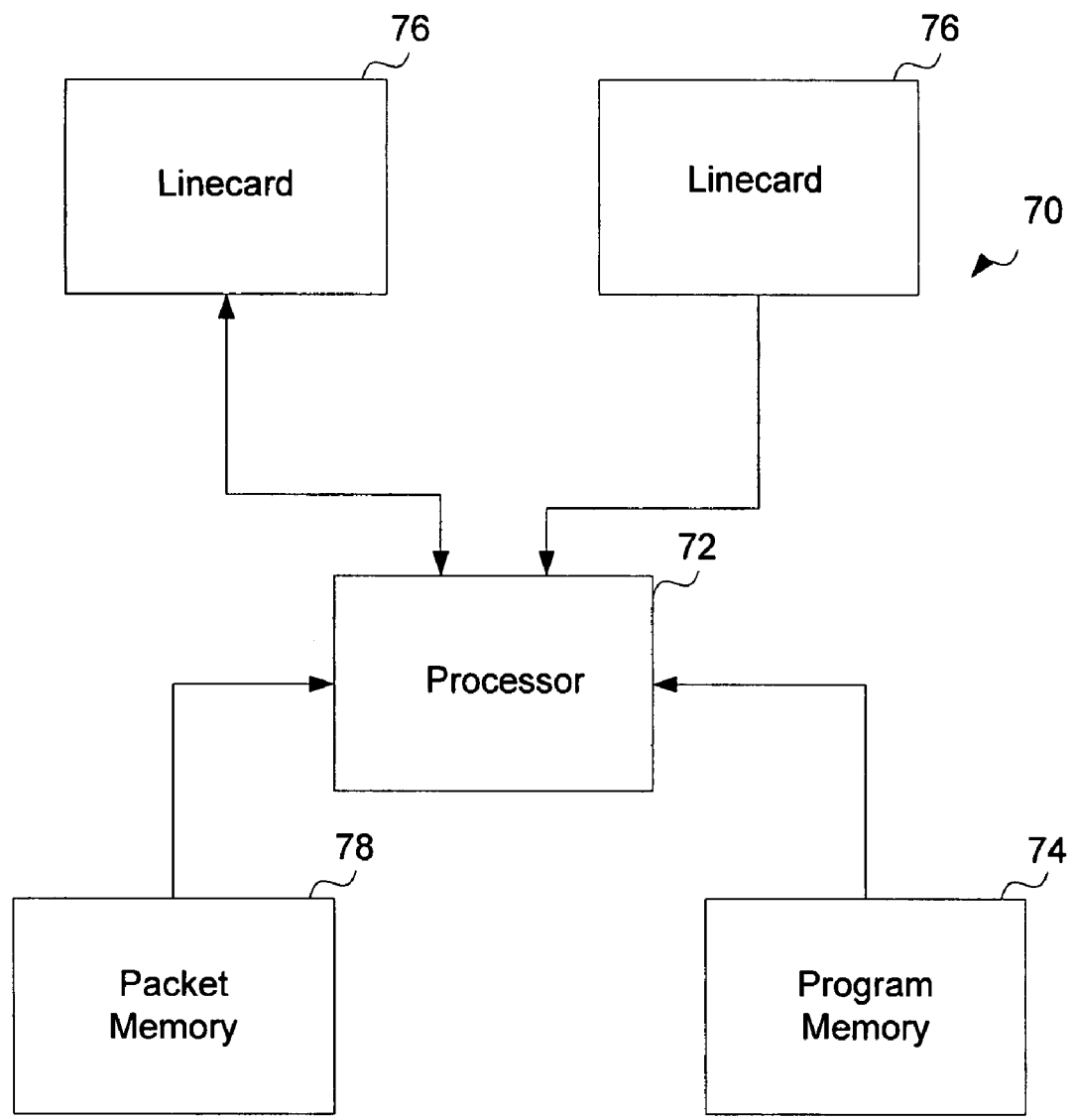
FIG. 6 depicts an example of a network device useful in implementing embodiments described herein.

FIG. 6 depicts a network device 70 that may be used to implement embodiments described herein. In one embodiment, network device 70 is a programmable machine that may be implemented in hardware, software, or any combination thereof. A processor 72 executes codes stored in a program memory 74. Program memory 74 is one example of a computer-readable medium. Program memory 74 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 70 interfaces with physical media via a plurality of linecards 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole.

As can be observed from the foregoing, the method and system described herein have many advantages. For example, nodes in the path from a client to server intercepting traffic at the transport/application layer can be detected. The method and system can be used to determine actual application network latency. The method and system also allow a server to detect the IP address of a real client rather than the IP address of the proxy client. The method and system may also be used to determine actual bandwidth requirements for QoS.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for identifying a network path between a source node and a destination node, the network path including one or more proxies, the method comprising:
   generating a proxy trace message at the source node, said proxy trace message comprising a Transmission Control Protocol (TCP) packet;
   transmitting said proxy trace message over the network path towards the destination node, said proxy trace message following a path taken by application messages transmitted by the source node and comprising an echo option to instruct said one or more proxies in the path to insert an IP address of the proxy in the proxy trace message, said one or more proxies configured to respond to said echo option; and
   receiving said proxy trace message at the source node, the received proxy trace message comprising addresses of the destination node and said one or more proxies and a counter identifying the number of proxies in the path;
   wherein said proxy trace message is intercepted by one or more intermediate nodes on the network path and redirected to said one or more proxies, each of said one or more proxies configured to establish a TCP connection with another of said one or more proxies or the destination node, and wherein said one or more proxies comprise one or more server or client proxies and said one or more intermediate nodes comprise routers or switches.

2. The method of claim 1 wherein the addresses of the destination node and said one or more proxies are contained within a data field of a TCP packet.

3. The method of claim 1 further comprising measuring latency with said proxy trace message.

4. The method of claim 1 further comprising establishing connections between the source node and one of said one or more proxies and between the proxy and the destination node or another of said one or more proxies in the network path.

5. The method of claim 1 wherein said proxy trace message comprises addresses of the source node and said one or more proxies when received at the destination node to identify the network path from the source node to the destination node.

6. A method for providing proxy information, comprising:
   receiving a proxy trace message comprising a Transmission Control Protocol (TCP) packet at a proxy located in a network path between a source node and a destination node, said proxy trace message comprising an echo option to instruct said one or more proxies in the network path to insert an IP address of the proxy in the proxy trace message, wherein said proxy trace message is a data plane packet;
   inserting a proxy identifier into said proxy trace message and incrementing a counter identifying the number of proxies in the network path in said proxy trace message, wherein said proxy identifier is inserted in a payload of the message, said payload comprising a node identifier for each node in the path said proxy trace message has passed through; and
   forwarding said proxy trace message to a destination node or another proxy in the network path;
   wherein said proxy trace message is intercepted by one or more intermediate nodes on the network path and redirected to the proxy, the proxy configured to establish a TCP connection with said another proxy or the destination node, and wherein the proxy comprises a server or client proxy and said one or more intermediate nodes comprise routers or switches.

7. The method of claim 6 wherein the source node, destination node, and proxy are configured to insert their IP address into the TCP packet upon receiving the TCP packet with said echo option.

8. The method of claim 6 wherein inserting a proxy identifier comprises inserting the proxy IP address into a data field of a packet.

9. An apparatus for identifying a network path between a source node and a destination node, the network path including one or more proxies, the apparatus comprising:
 a processor configured to generate a proxy trace message at the source node, said proxy trace message comprising a Transmission Control Protocol (TCP) packet comprising an echo option to instruct said one or more proxies in the path to insert an IP address of the proxy in the proxy trace message, said one or more proxies configured to respond to said echo option, transmit said proxy trace message over the network path towards the destination node, and receive said proxy trace message at the source node, the received proxy trace message comprising addresses of the destination node and said one or more proxies and a counter identifying the number of proxies in the network path, wherein said proxy trace message follows a path taken by application messages transmitted by the source node; and
 memory for storing the addresses of said one or more proxies in the network path;
 wherein said proxy trace message is intercepted by one or more intermediate nodes on the network path and redirected to said one or more proxies, each of said one or more proxies configured to establish a TCP connection with another of said one or more proxies or the destination node, and wherein said one or more proxies comprise one or more server or client proxies and said one or more intermediate nodes comprise routers or switches.

10. The apparatus of claim 9 wherein the processor is configured to establish a connection between the source node and the proxy.

11. An apparatus for providing proxy information, comprising:
 a processor configured to receive a proxy trace message comprising a Transmission Control Protocol (TCP) packet at a proxy located in a network path between a source node and a destination node, said proxy trace message comprising an echo option to instruct said one or more proxies in the network path to insert an IP address of the proxy in the proxy trace message, said proxy trace message comprising a data plane packet, insert a proxy identifier into said proxy trace message and increment a counter identifying the number of proxies in the network path in said proxy trace message, and forward said proxy trace message to a destination node or another proxy in the network path, wherein said proxy identifier is inserted in a payload of the message, said payload comprising a node identifier for each node in the path said proxy trace message has passed through; and
 memory for storing said proxy identifier;
 wherein said proxy trace message is intercepted by one or more intermediate nodes on the network path and redirected to the proxy, the proxy configured to establish a TCP connection with said another proxy or the destination node, and wherein the proxy comprises a server or client proxy and said one or more intermediate nodes comprise routers or switches.

12. The apparatus of claim 11 further comprising a WCCP (Web Cache Communication Protocol) cache engine and wherein said proxy trace message is intercepted at an intermediate node and redirected to the proxy using WCCP.

13. An apparatus for identifying a network path between a source node and a destination node, the network path including one or more proxies, the apparatus comprising:
 one or more processors; and
 a computer readable storage medium that stores instructions for execution by said one or more processor, said instructions comprising:
 code that generates a proxy trace message at the source node, said proxy trace message comprising a Transmission Control Protocol (TCP) packet;
 code that transmits said proxy trace message over the network path towards the destination node, said proxy trace message following a path taken by application messages transmitted by the source node and comprising an echo option to instruct said one or more proxies in the network path to insert an IP address of the proxy in the proxy trace message, said one or more proxies configured to respond to said echo option; and
 code that receives said proxy trace message at the source node, the received proxy trace message comprising addresses of the destination node and said one or more proxies and a counter identifying the number of proxies in the network path;
 wherein said proxy trace message is intercepted by one or more intermediate nodes on the network path and redirected to said one or more proxies, each of said one or more proxies configured to establish a TCP connection with another of said one or more proxies or the destination node, and wherein said one or more proxies comprise one or more server or client proxies and said one or more intermediate nodes comprise routers or switches.

14. An apparatus for providing proxy information, comprising:
 one or more processors; and
 a computer readable storage medium that stores instructions for execution by said one or more processor, said instructions comprising:
 code that receives a proxy trace message comprising a Transmission Control Protocol (TCP) packet at a proxy located in a network path between a source node and a destination node, said proxy trace message comprising an echo option to instruct said one or more proxies in the network path to insert an IP address of the proxy in the proxy trace message, wherein said proxy trace message is a data plane packet;
 code that inserts a proxy identifier into said proxy trace message and incrementing a counter identifying the number of proxies in the network path in said proxy trace message, wherein said proxy identifier is inserted in a payload of the message, said payload comprising a node identifier for each node in the path said proxy trace message has passed through; and
 code that forwards said proxy trace message to a destination node or another proxy in the network path;
 wherein said proxy trace message is intercepted by one or more intermediate nodes on the network path and redirected to the proxy, the proxy configured to establish a TCP connection with said another proxy or the destination node, and wherein the proxy comprises a server or client proxy and said one or more intermediate nodes comprise routers or switches.

* * * * *